United States Patent [19]
Aschberger et al.

[11] 3,842,631
[45] Oct. 22, 1974

[54] CAN BODY SHAPER
[75] Inventors: Anton A. Aschberger, Oak Lawn; Jack L. Avery, Park Forest; William J. Cartwright, Palos Park; Geoffrey J. Dean, Rockton; Oliver J. Tysver, Chicago Heights; Robert W. Wolfe, Oak Lawn; Frederick H. Bautz, Hazel Crest, all of Ill.
[73] Assignee: Continental Can Company, Inc., New York, N.Y.
[22] Filed: Sept. 25, 1973
[21] Appl. No.: 400,498

Related U.S. Application Data
[62] Division of Ser. No. 221,587, Jan. 28, 1972.

[52] U.S. Cl. ................................................. 72/63
[51] Int. Cl. .......................................... B21d 22/12
[58] Field of Search ............. 72/63; 425/405, 405 H

[56] References Cited
UNITED STATES PATENTS
2,849,977  9/1958  Nielsen et al. ........................... 72/63
3,561,079  2/1971  Anderson ......................... 425/405 H
3,593,551  7/1971  Roth et al. ............................ 72/56

Primary Examiner—Richard J. Herbst
Attorney, Agent, or Firm—Diller, Brown, Ramik & Wight

[57] ABSTRACT

This disclosure relates to a machine for receiving can bodies and automatically outwardly expanding the same to a decorative predetermined contour. The machine includes special transfer means for positioning can bodies on and removing can bodies from rotating supports, means for stopping a can body support in a predetermined position relative to the can body, a plurality of mold assemblies each including a tool pack carrying an expandible membrane receivable within a can body carried by the support and molder halves closeable about the supported can body and cooperating with the tool pack. The cooperation between the tool pack, the can body support and the mold halves is one wherein all stresses, both axial and radial are taken by the mold halves. Further, the membrane is one which may be repeatedly utilized before it must be replaced.

3 Claims, 21 Drawing Figures

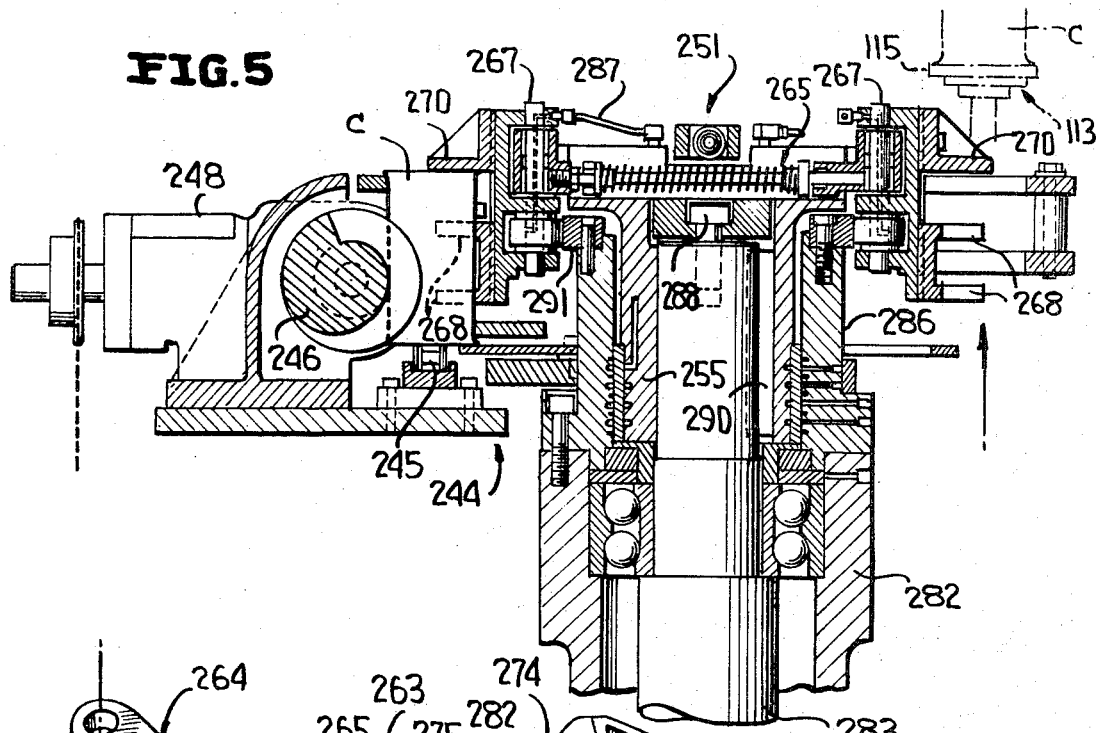
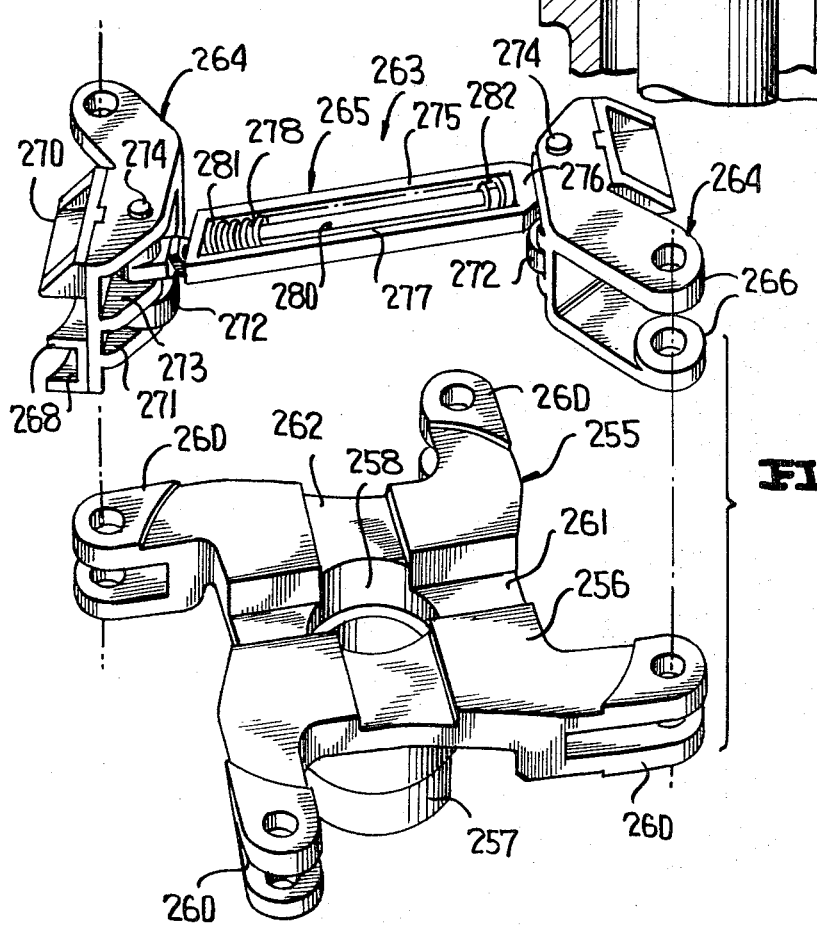

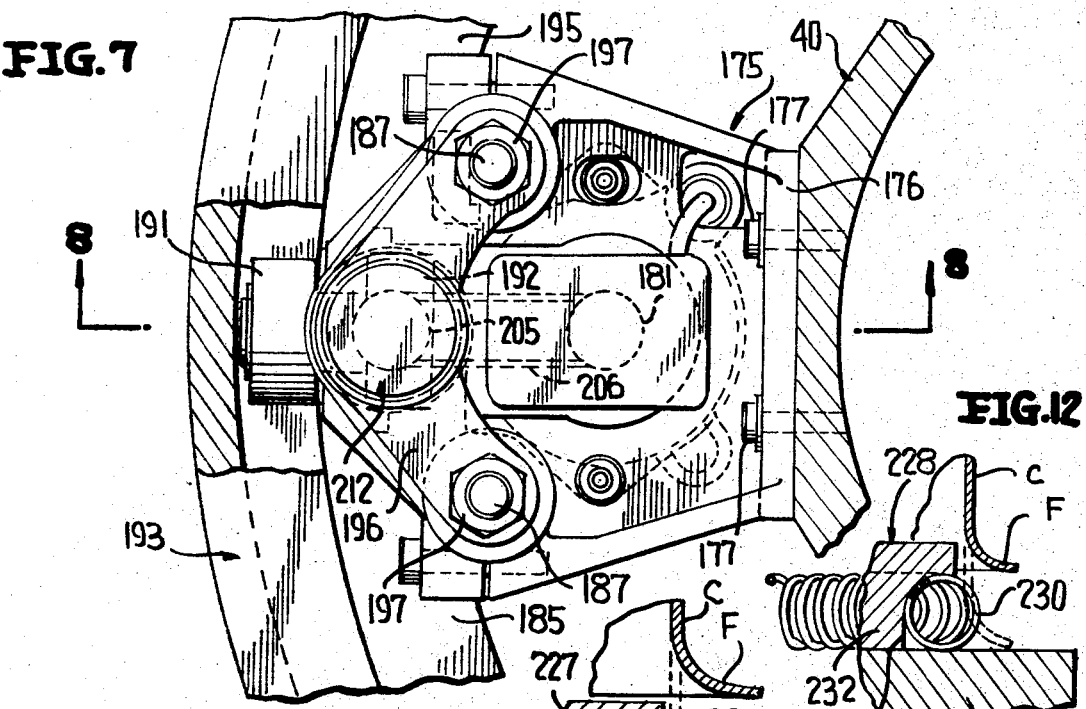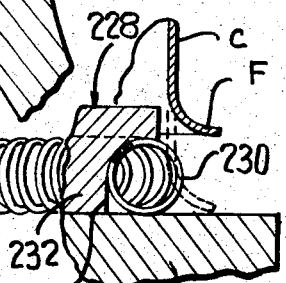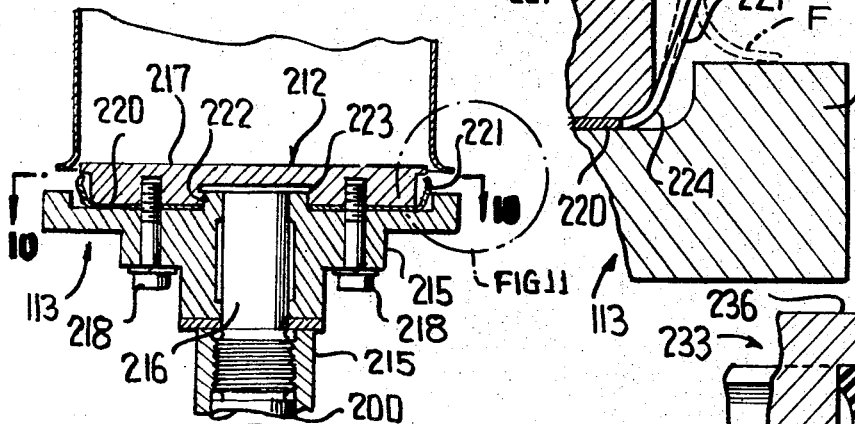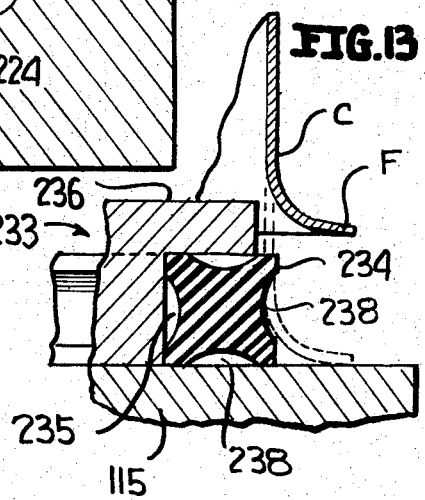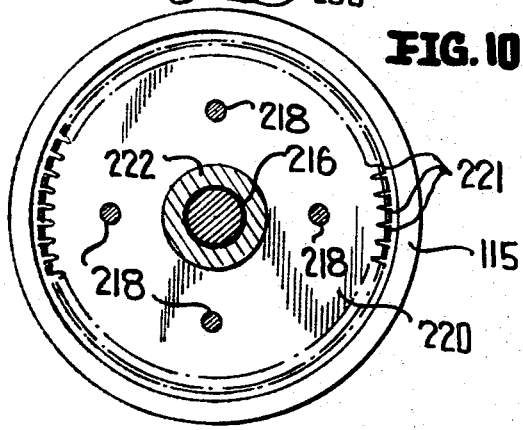

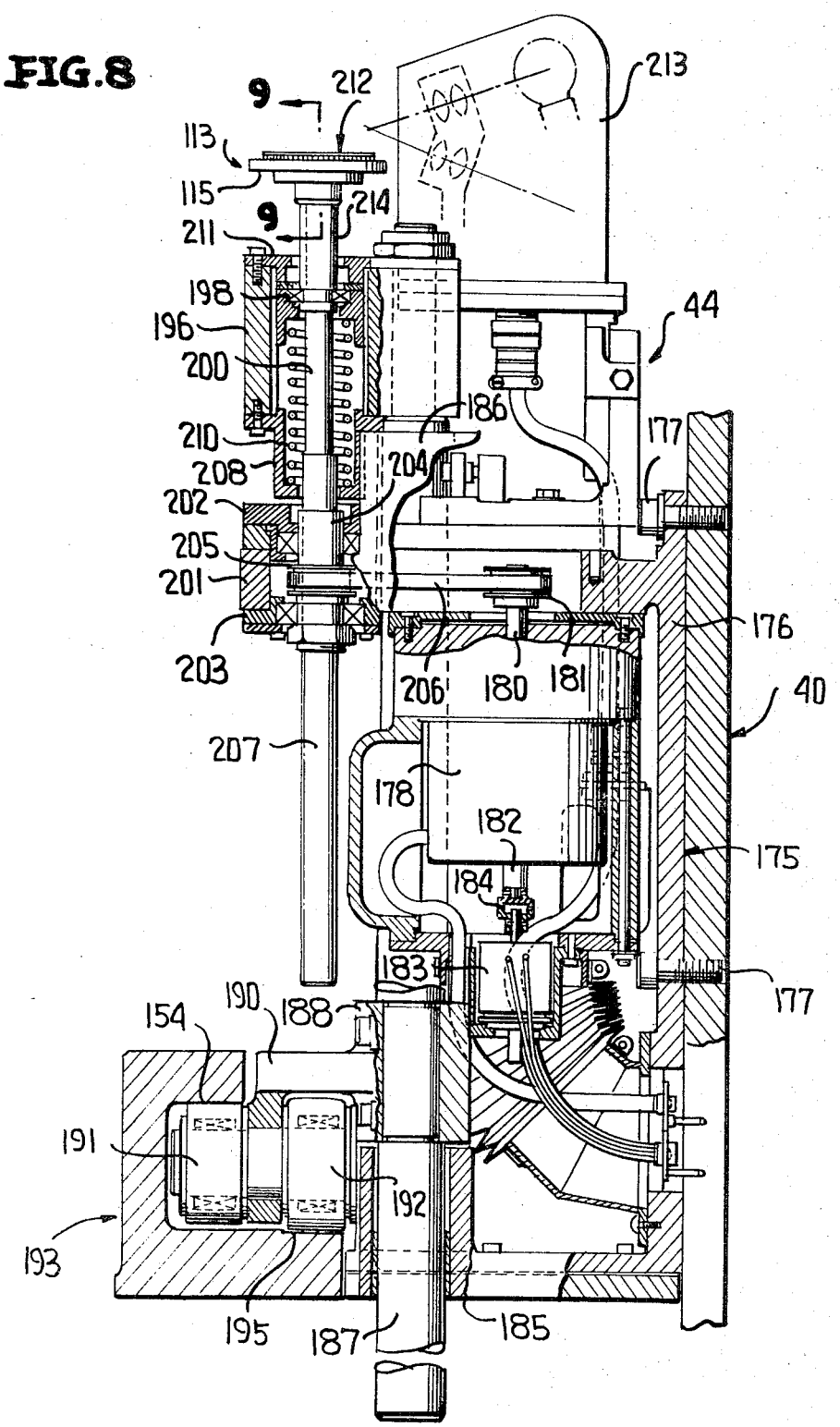

CAN BODY SHAPER

This is a division of Ser. No. 221,587, filed Jan. 28, 1972.

This invention relates in general to new and useful improvements in machines for manufacturing can bodies, and more particularly to a machine for changing the contour of can bodies so as to have an ornamental appearance.

BACKGROUND OF THE INVENTION

In recent years there has been a trend towards the production of stylized can bodies. Numerous efforts have been made to reshape can bodies from their original cylindrical configuration to a preselected ornamental configuration on a commercial basis. Such prior methods have included the use of a rubber mandrel and mechanical means for expanding the mandrel, gases ignition discharged within the can bodies, spark discharge within can bodies filled with asaline solution or other conductive solution, an internal pressurizing of can bodies by fluid pressure. Despite the tremedous efforts set forth by numerous interested parties, all efforts to date have resulted in machines in operations wherein the production is very poor and is not truly commercially feasible except with respect to can bodies for highly specialized articles wherein a very high price can be pair for the can body.

SUMMARY OF THE INVENTION

A principal feature of this invention is to provide a machine for shaping can bodies wherein the machine is operable on a commercial basis sufficiently economically to be utilized in conjunction with relatively inexpensive cans, such as those used in the packaging of beverages.

A principal feature of the machine is the provision of a membrane assembly which may be repeatedly utilized on the order of 40,000 times and above before it must be replaced whereby machine shut down time is held to a minimum and normally need not occur until a shift change at a minimum.

Another feature of this invention is the utilization of water as the expanding fluid within the membrane whereby during the changing of membranes and in the event of membrane rupture, the spillage will in no way be detrimental and may be easily taken care of.

Another feature of the invention is that each mold assembly is provided with its own water supply which is of a limited capacity whereby in the event of a line or membrane rupture, the spillage is held to a minimum and a minimum amount of time is required to replace the water supply.

Another feature of the invention is that the membrane assembly is part of a tool pack and the tool pack is constructed in a manner whereby it may be readily replaced so that when the time comes for a periodical change of membranes, the entire tool pack may be removed and replaced with one have a new membrane fitted thereon.

Another feature of the invention is that the tool pack of which the membrane is a part is so constructed whereby axial pressure as well as radial pressure is applied to the membrane, thereby tending to elongate the membrane upon each usage thereof, the elongation of the membrane being effective to reduce the radial stretching of the membrane and thereby permitting the membrane to be utilized a greater number of times before it must be replaced due to overstretching.

The machine has a plurality of shaper units and each shaper unit includes a support for a can body, a tool pack aligned with the support, and a mold assembly with the mold assembly interlocking with the tool pack and the support member whereby the mold assembly resists both radial and axial stresses which occur during the pressurization of the membrane.

Another feature of the invention is that the mold assembly includes mold halves mounted within mold housing halves for limited axial movement and wherein the mold halves are normally spaced from the support member and are movable in advance of the shaping of a can body to clamp the can body against the support member whereby the can body is axially fixed during the shaping thereof.

It is to be understood that the shaping units are mounted on a frame for rotation along a predetermined circular path. It is, therefore, necessary to transfer can bodies to and from the support members while the support members are moving in a circular path. If one utilizes a conventional turret for such transfer, the path of the turret coincides with the path of the support members only at a single point. This is insufficient for an accurate transfer. Accordingly, a feature of this invention is the provision of a novel transfer mechanism which, while it moves in a generally circular path, has means for varying the shape of the path so that the path of a can body carried by the transfer device coincides with the path of the support members for a relatively great extent so that proper transfer of can bodies from the transfer device to the support members is assured.

Another feature of the invention is that the support members for receiving can bodies are in the form of chucks which are telescoped within the can bodies in interlocking engagement therewith so that the can bodies may freely rotate with the support members and may be moved axially with the support members into telescoped engagement over the tool packs.

Still another feature of the invention is the provision of drive means for rotating the support members as the support members move axially with can bodies thereon, and there being brake means associated with the drive means for stopping the rotation of the support members, the brake means having associated therewith control means for operating the same with the control means being of the indicia identifying type for stopping the rotation of the support members with can bodies thereon oriented in a predetermined relationship.

A final feature of the invention is the provision of a drive and brake assembly for the machine wherein the machine is provided with a ring gear through which the machine is driven to rotate the same, and the brake means are in the form of clamping type brake elements which engage the ring gear in the manner of disc brakes so as to effect the stopping of the rotation of the machine frame without imparting undesirable stopping forces on the teeth of the ring gear and a drive gear associated therewith.

With the above and other objects in view that will hereinafter appear, the nature of the invention will be more clearly understood by reference to the following detailed description, the appended claims and the several views illustrated in the accompanying drawings:

In the drawings:

FIG. 5 is a fragmentary vertical sectional view taken generally along the line 5—5 of FIG. 4 and shows specifically the details of one of the transfer devices.

FIG. 6 is an enlarged exploded perspective view of the principal elements of one of the transfer devices.

FIG. 7 is an enlarged fragmentary horizontal sectional view taken generally along the line 7—7 of FIG. 3 and specifically shows the details of the can body support.

FIG. 8 is an enlarged fragmentary vertical sectional view taken along the line 8—8 of FIG. 7 and shows specifically the details of the can body support, the means for rotating the same, and orienting means associated therewith.

FIG. 9 is an enlarged fragmentary vertical sectional view taken generally along the line 9—9 of FIG. 8 and shows the specific details of the platen of the can body support and a chuck carried thereby.

FIG. 10 is an enlarged fragmentary horizontal sectional view taken along the line 10—10 of FIG. 9 and shows further the details of the chuck.

FIG. 11 is an enlargement of the circled portion of FIG. 9 and shows specifically the action of the chuck as a can body is received thereover.

FIG. 12 is a view similar to FIG. 11 and shows a modified chuck construction.

FIG. 13 is another view similar to FIG. 11 and shows still another form of chuck construction.

Figure 1:
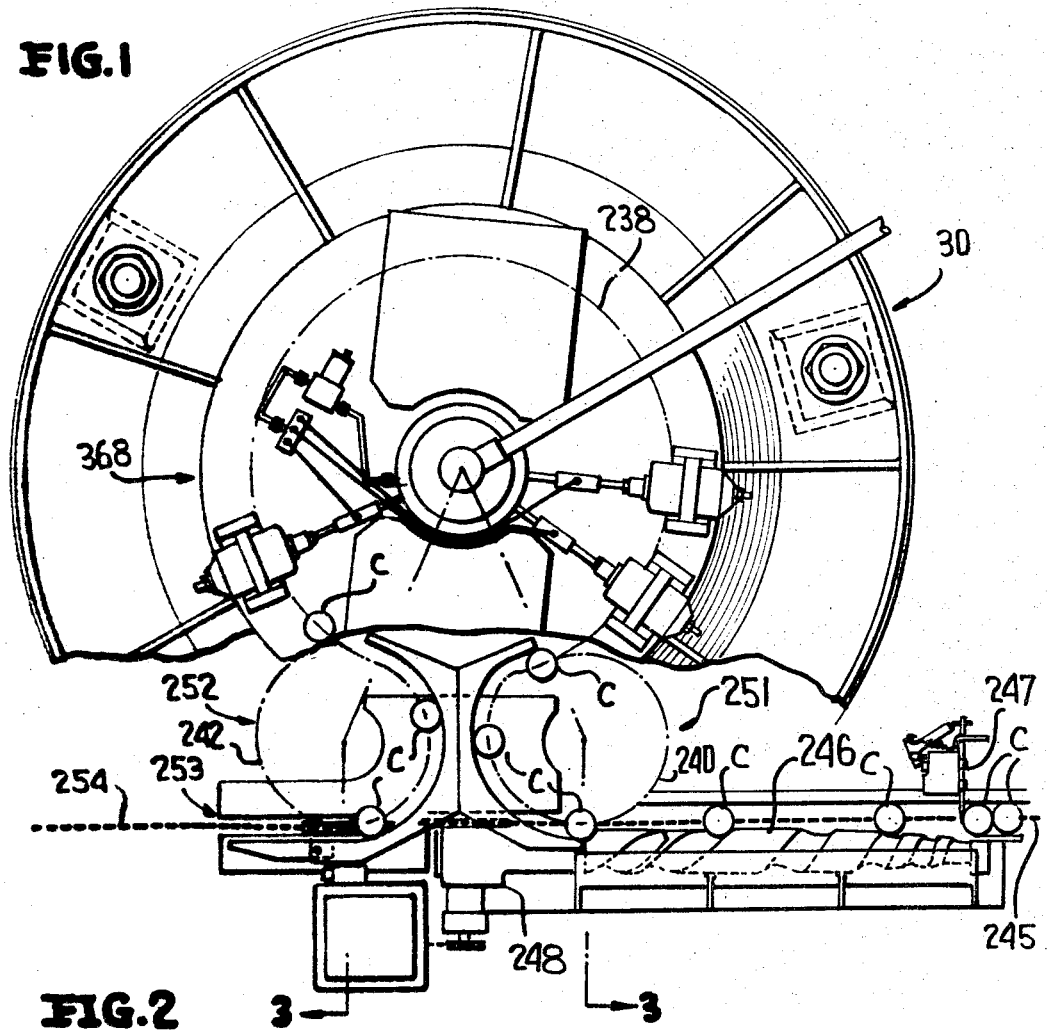
FIG. 1 is a plan view of the machine with parts broken away and shows schematically the infeed and outfeed of the machine.

Referring now to the drawings in detail, it will be seen that the machine is identified by the numeral 30 and includes a base, generally identified by the numeral 31. The base 31 is provided with suitable supports 32 for mounting the same in an elevated position with respect to the supporting floor (not shown). The machine 30 also includes a head structure 33 which is supported from the base 31 by means of a plurality of circumferentially spaced standards 34.

The base 31, among other structural features, includes a ring-like support member 35 carrying a bearing assembly 36. The head structure 33 also includes a ring-like support member 37 which carries a bearing 38. The bearings 36 and 38, in turn, support for rotation a central frame, which is generally identified by the numeral 40, and which is of a fabricated construction. It is to be noted that the central frame 40 is constructed without the usual center shaft which supports the same. Basically, the central frame 40 is of a tubular construction and in of itself defines a large diameter shaft so as to have sufficient rigidity.

The frame 40 has mounted on the exterior surface thereof in circumferentially spaced relation a plurality of vertically extending body shapers, each body shaper being generally identified by the numeral 41. Each body shaper 41 includes basically a mold unit, generally identified by the numeral 42, a tool pack, generally identified by the numeral 43, and an orientation mechanism, generally identified by the numeral 44.

Figure 14:
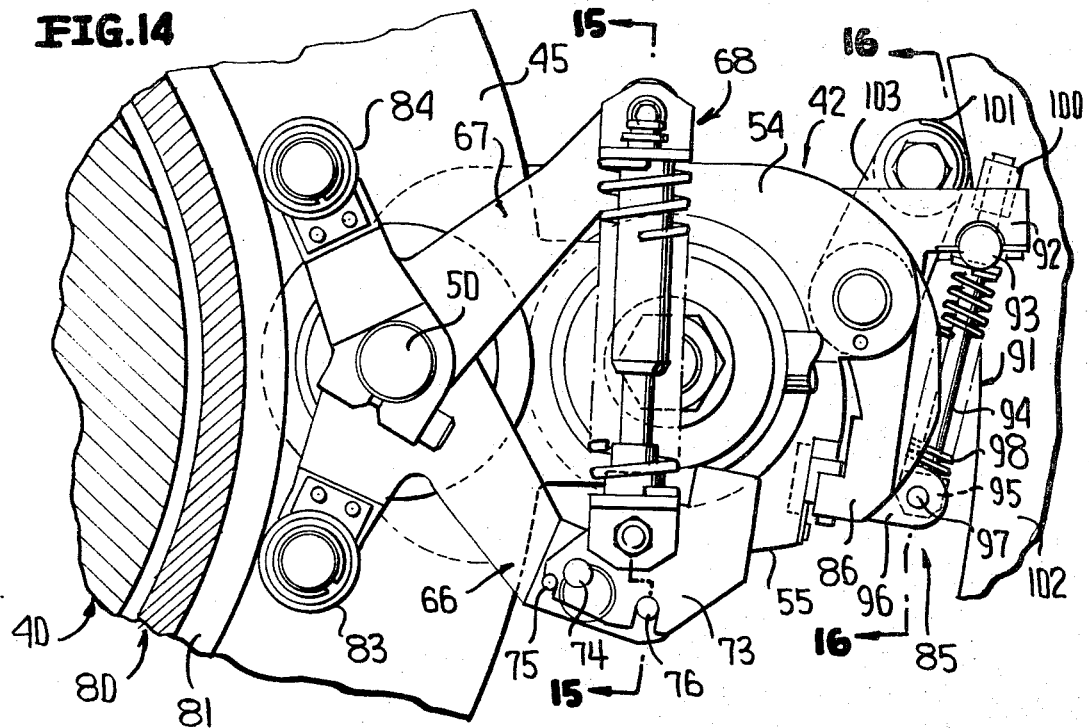
FIG. 14 is an enlarged fragmentary horizontal sectional view taken along the line 14 — 14 of FIG. 3 and shows the details of one of the mold assemblies.

In the proposed machine, there will be 10 body shapers 41 although the number thereof will vary in accordance with the particular machine and the requirements thereof. Only a single body shaper will be specifically described herein, and reference is now had to FIGS. 14 through 20 as to the specific details of one of the body shapers 41. In order to facilitate the mounting of the body shapers 41, the central frame 14 is provided adjacent the upper portion thereof with a turret ring 45 which is best shown in FIG. 14 and which is provided with a bushing 46 for each of the body shapers 41. Aligned with each bushing 46 and carried by the lower part of the central frame 40 is a lower bearing support 47 having a suitable sleeve bearing 48 therein. A first shaft 50 extends through the bushing 46 and has the lower end thereof journalled within the bearing 48 for limited pivotal movement. The upper part of the first shaft 50 is journalled within a sleeve bearing 51 carried by a tubular second shaft 52 which has the upper portion thereof journalled within a sleeve bearing 53 carried by the bushing 46. Thus, the shafts 50 and 52 cooperate with one another to support one another for relative pivotal movement both with respect to one another and with respect to the central frame 40.

The mold unit 42 includes a split housing formed of a pair of mold housing halves 54 and 55 with the mold housing half 54 having ears 56 and 57 extending therefrom, the ear 56 having received therein the lower portion of the shaft 52 and being rigidly secured thereto for pivotal movement therewith. A sleeve bearing 58 is disposed between the shafts 51 and 52 in alignment with the ear 56, the sleeve bearing 58 cooperating with the sleeve bearing 51 to center the shaft 52 relative to the shaft 50.

The ear 57 of the mold housing half 54 is directly journalled on a lower part of the shaft 50 by means of a sleeve bearing 60. It will thus be apparent that the mold housing half 54 is free to pivot with the outer shaft 52 relative to the inner shaft 50.

The mould housing half 55 is also provided with a pair of ears 61 and 62. The ear 61 is disposed between the ears 56, 57 and is directly mounted on an intermediate part of the shaft 50. The ear 62 is disposed below the ear 57 and above the bearing block 47 with the ear 62 being seated on a flange 63 integrally formed with the shaft 50. The flange 63, in turn, seats on a thrust bearing 64 which reacts against the bearing block 47.

It is also to be noted that the shaft 42 is provided with an integral flange 65 disposed above the ear 56. The ear 62 is fixedly secured to the flange 63 for rotation therwith by means of suitable fasteners (not shown), and in a like manner, the ear 56 is secured to the flange 65. With particular reference to FIG. 14, it will be seen that the upper end of the shaft 52 is provided with a generally V-shaped lever, identified by the numeral 66, and the shaft 50 is provided with a second generally V-shaped lever, identified by the numeral 67. A spring assembly, generally identified by the numeral 68, extends between the levers 66, 67 in overlying relation to the split mold housing and constantly urges the levers 66, 67 apart while at the same time constantly urging the mold housing halves 54, 55 together.

Figure 15:
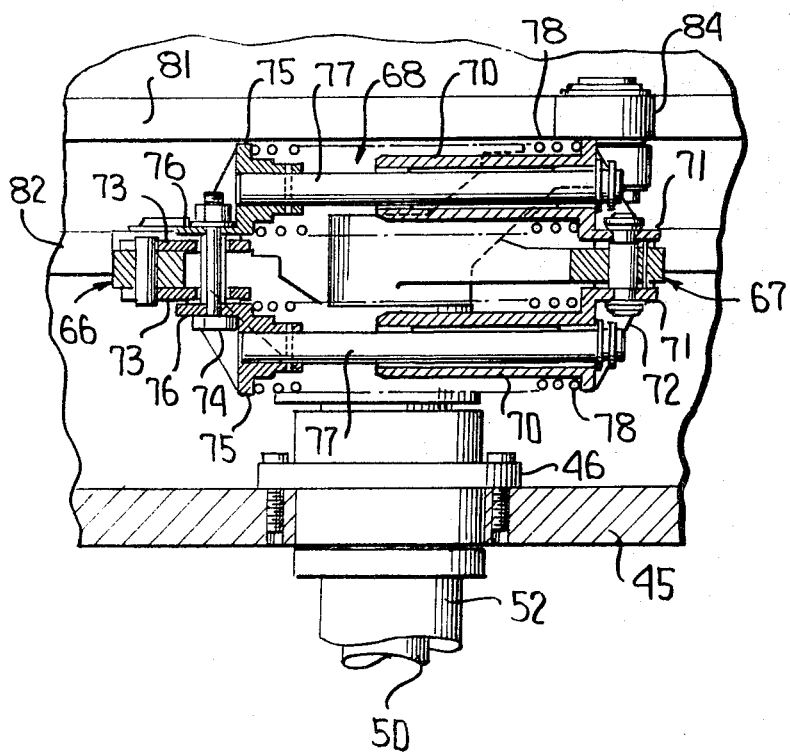
FIG. 15 is an enlarged fragmentary vertical sectional view taken generally along the line 15 —15 of FIG. 14 and shows the arrangement of spring means constantly urging the mold halves to closed positions.

Referring now to FIG. 15 in particular, it will be seen that the spring unit 68 includes upper and lower tubular members 70 each having a mounting flange 71 which is pivotally mounted on the lever 67 by means of a vertical pin 72. The lever 66 carries a pair of mounting plates 73 which are secured in place by means of a pin 74 and a pair of abutment pins 75, 76, as is best shown in FIG. 14. The plates 73, in turn, carry a pivot pin 74 on which fittings 75 are mounted for pivotal movement by means of mounting flanges 76. Each fitting 75 is aligned with the respective tubular member and has a shaft 7r extending therefrom with the shaft 77 being suitably mounted within the associated tubular member 70 for relative sliding movement. A compression spring 78 is telescoped over each tubular member and a portion of the associated fitting 75 so as to constantly urge each set of tubular members 70 and fitting 75 apart, thereby constantly urging the levers 66, 67 apart.

Referring once again to FIG. 3, it will be seen that the head structure 33 includes a cam ring 80. As is shown in FIGS. 14 and 15, the cam ring 80 is provided with an upper cam 81 and a lower cam 82. The lever 66 is provided with a cam follower 83 which engages the cam 82 while the lever 67 is provided with a cam follower 84 which engages the cam 81. As the mold unit 42 rotates with the central frame 80, during a predetermined point in the travel of the mold unit 42, the cam followers 83 and 84 will ride up on cam portions of the cam 82, 81 urging the levers 66, 67 towards one another in opposition to the compression of the spring unit 68 and cause the mold housing halves 54 and 55 to swing to an open position. When the mold unit 42 is open, a previously shaped can body may be removed therefrom and a cam body to be shaped inserted therein. Thereafter, the cam followers 83, 84 will ride off of the cam portions and the spring unit 68 will then effect the automatic closing of the mold unit 42.

In order that the mold unit 42 may not open during the shaping of a can body, a latch mechanism, generally identified by the numeral 85, is provided for latching the mold housing halves 54, 55 in their closed position.

Figure 18:
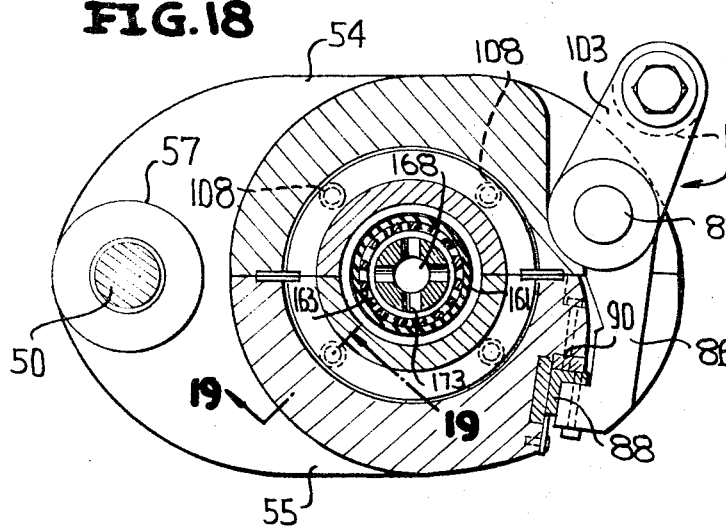
FIG. 18 is an enlarged horizontal sectional view taken along the line 18 — 18 of FIG. 17 and shows further the details of the mold assembly.

As is clearly shown in FIG. 18, the latch unit 85 includes a latch arm 86 pivotally mounted on the mold housing half 54 by means of a pivot pin 87. The latch arm 86 is provided with a replaceable latch block 88 which, in turn, is lockable behind a replaceable latch plate 90 carried by the mold housing half 55. Thus, when the latch arm 86 is in the position illustrated in FIG. 18, the mold housing halves 54 are interlocked against separation.

Figure 16:
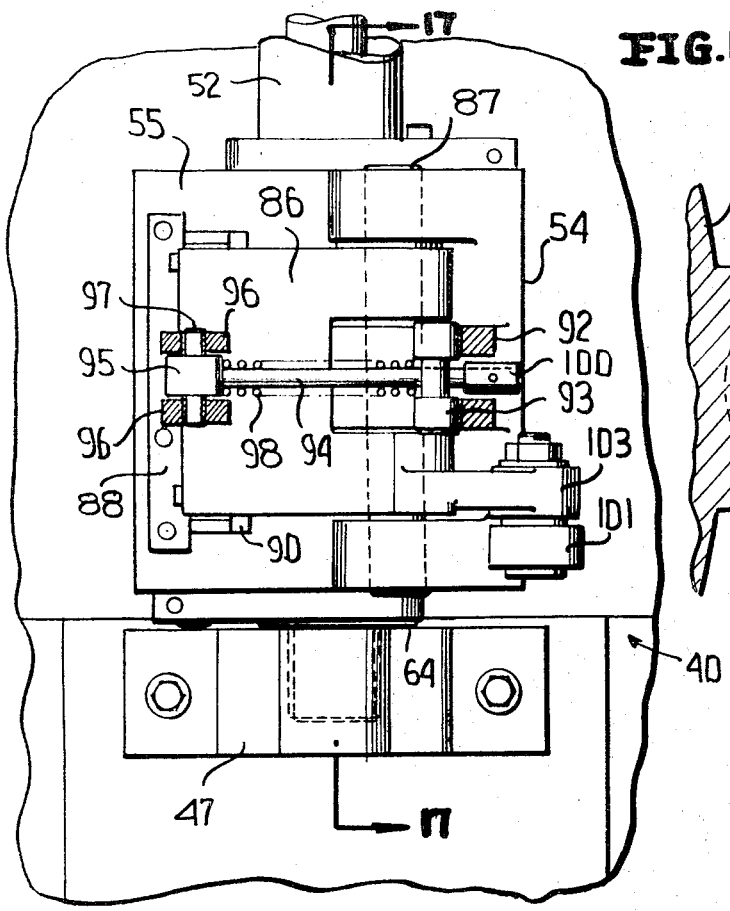
FIG. 16 is an enlarged fragmentary vertical sectional view taken generally along the line 16 — 16 of FIG. 14 and shows generally the details of the locking mechanism of one of the mold assemblies.

Referring now to FIGS. 14 and 16, it will be seen that the latch arm 86 is constantly urged to a mold latching position by meanS of an over-center spring assembly, generally identified by the numeral 91. This spring assembly includes a pair of ears 92 extending from the mold housing half 54 having a large diameter pin 93 seated therein for limited rocking movement. The pin 93 has a rod 94 extending therethrough with the opposite end of the rod 94 being provided with a fitting 95 positioned between a pair of ears 96 which project from the latch arm 86 and being pivotally connected to the ears 96 by means of a pivot pin 97. A spring 98 is telescoped over the rod 94 and reacts against both the fitting 95 and the pin 93 so that when the latch member 86 is in the over-center position illustrated in FIG. 14, the latch arm 86 will remain in a latching position. It is to be noted that the rod 94 extends through the pin 93 and is provided with a retaining collar 100.

The latch arm 86 is moved to a releasing position by means of a cam follower 101 when the same engages a predetermined portion of a cam 102. The cam follower 101 is carried by an arm 103 which is fixedly connected to the latch arm 86. The cam 102, in turn, is suitably carried by the fixed frame of the machine 30.

It is also to be noted at this time that the spring assembly 91 will serve to hold the latch arm 86 in an inoperative position. If it is desired to utilize this feature, it will be necessary, of course, to provide an additional cam (not shown) for engaging the cam follower 101 and move the latch arm 86 back beyond its over-center position towards a mold latching position.

Figure 19:
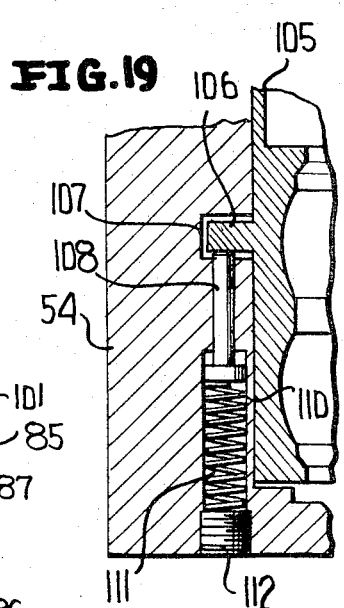
FIG. 19 is an enlarged fragmentary vertical sectional view taken the line 19 — 19 of FIG. 18 and shows the specific mounting of a mold half within a mold housing half.
Figure 17:
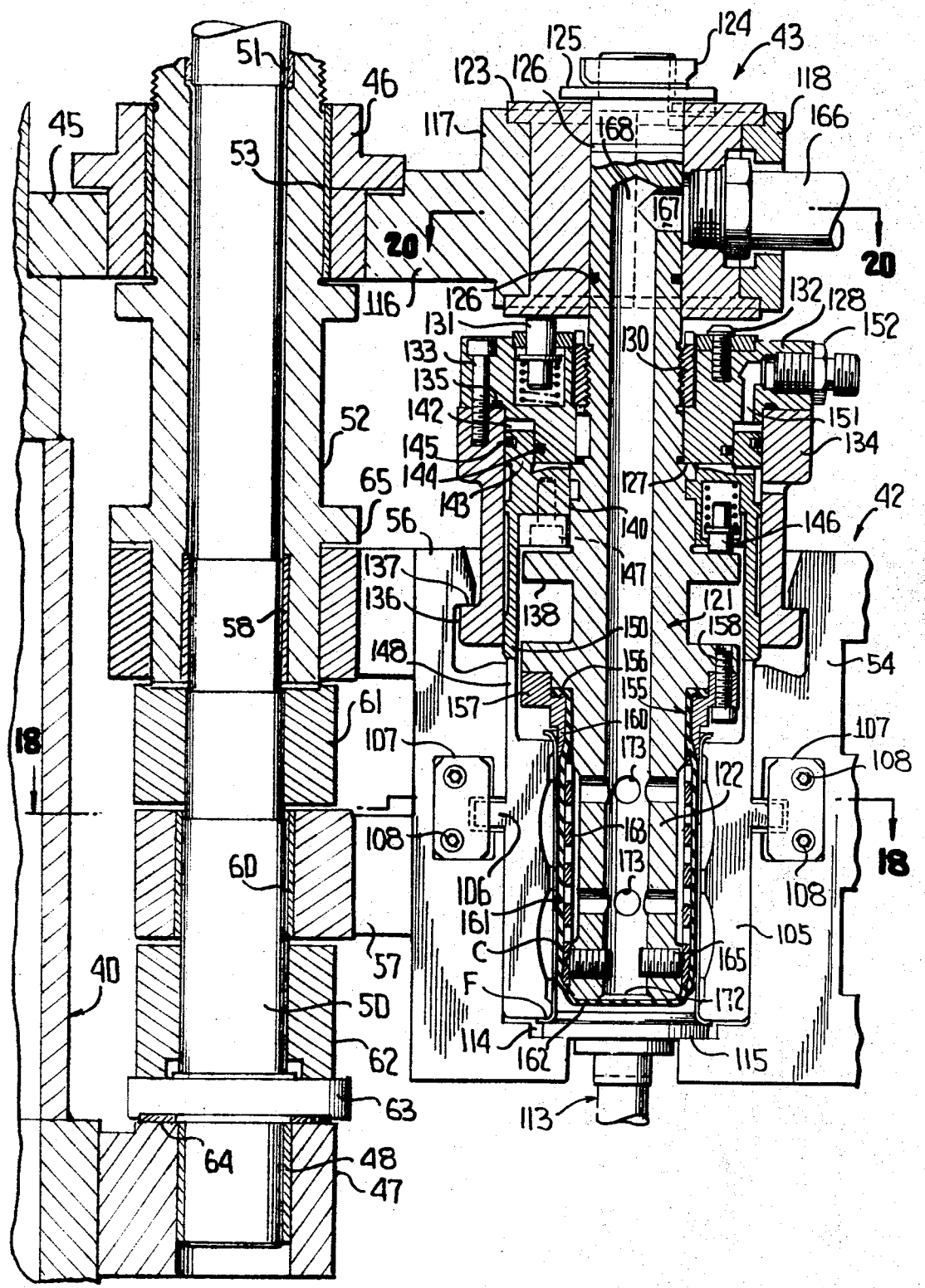
FIG. 17 is an enlarged fragmentary vertical sectional view taken generally along the line 17—17 of FIG. 16 and shows specifically the details of one of the mold assemblies, including the mounting thereof on the turret frame of the machine.

Reference is now made to FIGS. 17 and 19 wherein it will be seen that the mold unit also includes split mold segments 105. Each mold segment is carried by one of the mold housing halves 54, 55 and is provided with an intermediate flange 106 which is loosely positioned within an annular groove 107 in the respective mold housing half for limited vertical movement of the mold segment relative to the mold housing half. Each mold segment 105 is retained in its respective mold housing half by means of a pair of plates 107 which are recessed in the parting face of the respective mold housing half 54 and which engages a respective one of the flanges 106 of the mold segment. The plates 107 are removably secured in place by means of suitable fasteners 108.

At the time the mold segments 105 close about a can body to be shaped, it is desired that the mold segments 105 be in an uppermost position. This is accomplished by providing each mold housing half with at least two spring loaded pins 108, as is shown in FIGS. 18 and 19. Each pin 108 projects into the associated recess 107 and engages the flange 106 of the associated mold segment 105. Each pin 108 is urged upwardly by a spring 110 disposed within a bore 111 having the lower end thereof closed by a plug 112.

Figure 20:
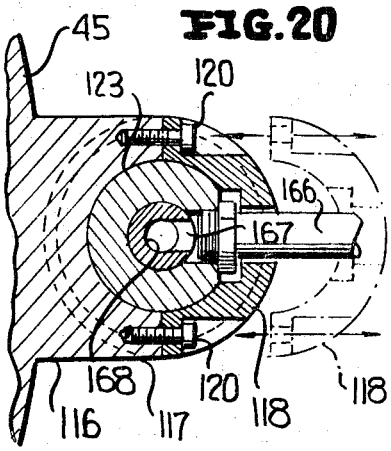
FIG. 20 is an enlarged fragmentary horizontal sectional view taken along the line 20 — 20 of FIG. 17 and shows the manner in which a tool pack of the mold assembly is mounted for quick replacement.

At this time it is pointed out that can bodies are presented to the mold units 42 by means of body supports, generally identified by the numeral 113. The body supports are part of the orientation mechanism 44 which will be described hereinafter. It is, however, to be noted that the mold housing halves 54, 55 are recessed as at 114 beneath the mold segments 105 for the reception of a platen 115 of each body support 113, and that when the mold housing halves are closed, portions thereof will be engaged beneath the platen 115 associated therewith. Each tool pack 43 is in vertical alignment with an associated body support 113 and is carried by an extension 116 of the turret ring 45 with each extension 116 including an enlarged boss 117 of a split construction including a removable cap 118 which is secured in place by readily accessible and easily removable fasteners 120, as is shown in FIG. 20. By merely removing the cap 118 and disconnecting certain quick disconnect couplings to be described hereinafter, a tool pack may be readily replaced.

The tool pack 43 includes an elongated support member generally identified by the numeral 121. The support member 121 includes a lower portion 122 receiveable within the mold unit 42. The upper end portion of the support member 121 has mounted thereon a bushing 123 of a configuration to be clamped within the boss 117. The bushing 123 is retained on the support member 121 against removal by means of a nut 124 and washer 125 assembly. The bushing 123 closely fits the upper part of the support member 121 and is sealed relative thereto by vertically spaced sealing rings 126.

The support member 121 has an intermediate shoulder 127 on which a reaction ring 128 is seated by means of a retainer 130 threadedly engaged with the support member 121. The reaction ring 128 is provided with circumferentially spaced spring loaded pins 131 which bear against the underside of the bushing 123 and constantly urge the support member 121 downwardly with respect to the boss 117 and the bushing 123. Upward movement of the support member 121 relative to the bushing 123 is limited by means of a removable stop pin 132.

The reaction ring has removably secured thereto by means of fasteners 133 a cylinder 134 which is telescoped over the support member 121 in spaced relation thereto. The cylinder 134 is sealed relative to the reaction ring 128 by a seal ring 135. The cylinder 134 is provided at the lower end thereof with an outwardly directed flange 136 which underlies a shoulder 137 of the mold housing halves 54, 55 so as to interlock the mold units 42 with the cylinder 134 for a purpose to be described hereinafter.

The support member 121 is provided below the shoulder 127 which a flange 138 and between the flange 138 and the shoulder 127, the support member 121 has slidably mounted thereon a cylindrical piston 140.

The lower portion of the reaction ring 128 is of a reduced diameter and cooperates with the upper portion of the cylinder 134 to define an annular cylinder 142 in which an upper annular piston portion 143 of the piston 140 is received. Suitable sealing rings 144 and 145 are provided to assure proper sealing of the piston portion 143 with respect to the cylinder 142.

It is to be noted that the piston 140 is constantly urged to an uppermost position by spring loaded pins 146 carried thereby and which react against the flange 138. Downward movement of the piston 140 relative to the support member 121 is limited by means of a replaceable stop pin 147 which also reacts against the flange 138.

It is further to be noted at this time that the mold segments 105 have upper extensions 148 which are aligned with and abut a lower extension 150 of the piston 140 so that the piston 140 may be utilized to move the mold segment 105 downwardly against the resistance of the spring loaded pins 108.

Figure 3:
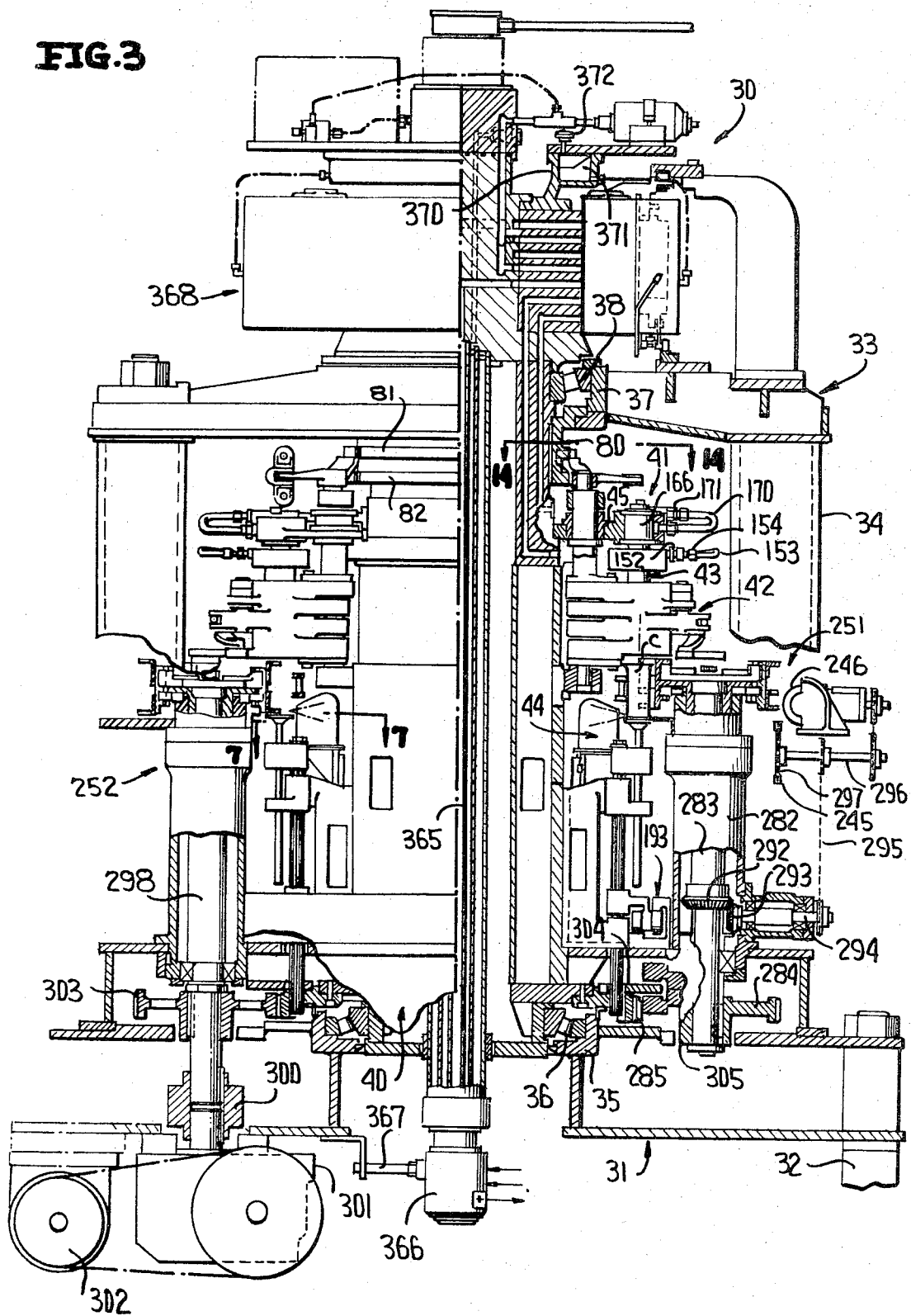
FIG. 3 is an elevational view of the machine with a portion thereof removed generally along the line 3—3 of FIG. 1 and shows the specific details of the machine.

The reaction pin 128 is provided with a fluid passage 151 which opens into the cylinder 142 for supplying fluid under pressure into the cylinder 142 to react against the piston portion 143. Fluid is supplied into the fluid passage 151 through a fitting 152 to which, as is best shown in FIG. 3, a fluid line 153 is connected by means of a quick release coupler 154.

The tool pack 43 also includes an expandible membrane which is generally identified by the numeral 155. The membrane 155 is provided with an upper flange 156 which is clampable against a shoulder of the support member 121 by means of a removable collar 157 which is secured in place by means of suitable fasteners 158. The collar 157 has a lower portion 160 which is receivable within the upper end of a can body C to be shaped so as to center the same relative to the support member 121.

The membrane 155 also includes a cylindrical portion 161, which is telescoped over the lower portion 122 of the support member 121. The membrane 155 further includes a closed lower end 162.

The lower portion 122 of the support member 121 has telescoped thereover a perforated sleeve 163 which functions to distribute fluid uniformly within the membrane 155 in a manner to be described hereinafter. The sleeve 163 is releaseably retained on the support member 121 by spring loaded ball detent assemblies 165 carried by the lower portion of the support member 121.

It is to be understood that the membrane 155 is initially stretched over the perforated sleeve 163 and is clamped in place on the support member 121 by the collar 157. However, after repeated usage, the membrane 155 has a tendency to increase in diameter and it eventually will stretch to the point that when it initially had clearance with respect to can bodies telescoped thereover, the clearance will diminish to the point that can bodies cannot be automatically telescoped over the membrane 155 and the same will have to be replaced.

In order that the membrane 155 may be selectively expanded in order to shape a can body C in conjunction with the mold segments 105 surrounding the same, the bushing 123 is provided with a fitting 166 which opens through a horizontal bore 167 in the support member 121 to an axial bore 168 in the support member. The fitting 166 has connected thereto a fluid line 170 which, in turn, is provided with a quick release coupler 171, as is shown in FIG. 3.

The axial bore 168 terminates at its lower end in a port 172 which opens against the end wall 162 of the membrane. The lower portion 122 of the support member 121 is also provided with a plurality of radially extending ports 173 which open within the perforated sleeve 163 and supply fluid under pressure through the perforated sleeve 163 against the cylindrical portion 161 of the membrane 155.

It will be readily apparent that when fluid under pressure is supplied to the interior of the support member 121, the membrane 155 will be outwardly expanded. At the same time, it will be axially elongated so that stretching will primarily occur in an axial direction although each time the membrane is expanded, it is radially expanded. It is to be noted that the end wall 162 of the membrane 155 is initially spaced from the body support 113. By providing for this longitudinal or axial elongation of the membrane 155, and by utilizing the perforated sleeve 163 to equally distribute fluid within the membrane, it has been found that the life of the membrane can be greatly extended. That is it may be expanded a very large number of times before it has stretched to the point that it cannot be readily received within a can body in the automatic operation of the machine 30.

It is to be understood that the membranes 155 will have to be periodically replaced at relatively short intervals, that is as a matter of days, as opposed to a matter of weeks or months in view of the large capacity of the machine 30. As previously indicated, the entire tool pack 43 is readily removable. All that is required to remove the tool pack 43 once the mold unit 42 is open is to disconnect the quick disconnect couplers 154 and 171 and to remove the clamping half 118 of the boss 117. With the entire tool pack 143 thus removed, the membrane 115 may be readily replaced. Under the normal operation of the machine 130, there will be an extra supply of the tool packs 43 so that tool packs 43 with new membranes 155 thereon will be readily available for replacement of the tool packs which have been operated on the machine.

BODY SHAPER OPERATION

With the mold housing halves 54, 55 in their open positions, the body support 13, with a can body C positioned thereon, is moved vertically to the position illustrated in FIG. 17. Thereafter, the mold housing halves 54, 55 are closed so as to bring the mold segment 105 into closed relation around the can body C. At this time, the lower ends of the mold segments 105 are spaced above the lower flange F of the can body, the mold segments 105 being held in their upper positions by the spring loaded pins 108. At the same time, the reaction ring 128 and the cylinder 134 are in their lowered positions with the flange 136 being spaced below the abutment shoulder 137.

Fluid is now supplied to the tool pack 43 through the fitting 152 with fluid flowing into the cylinder 142. This results in a reaction as between the walls of the cylinder 142 and the piston 140 with the result that the reaction ring 128 moves upwardly drawing therewith the cylinder 134 so that the cylinder becomes interlocked and is restrained against axial movement by the mold housing halves 54, 55, the mold housing halves 54, 55 moving upwardly slightly so as to assure an engagement thereof with the underside of the platen 115. At the same time, the piston 140 moves downwardly, moving downwardly therewith the extension 150 which engages the extension 148 of each mold segment 105 and forces the mold segments 105 downwardly so as to clamp the flange F of the can body C against the platen 115. The can body C is now ready to be shaped in accordance with the configuration of the mold segments 105.

Fluid under very high pressure is then directed into the support member 121 and radially expands the membrane 155 so as to radially expand the can body C in accordance with the configuration of the mold segments 105. It is to be understood that in the radial outward expansion of the can body, the can body will be slightly foreshortened. However, since the can body is free to move vertically in guided relation with respect to the extension 160 of the collar 157, no problem is involved in this movement. It is also pointed out here that the extension 160 cooperates with the upper part of the mold segments 105 to support the upper part of the can body whereby undue deformation of the upper part of the can body is prevented.

ORIENTATION MECHANISM

With particular reference to FIG. 8, it will be seen that the orientation mechanism 44 includes a frame 175 which includes a mounting portion 176 that is removably secured to the central frame 40 by means of suitable fasteners 177. The frame 175 has suitably mounted therein an electric motor 178 which includes an output shaft 180 on which a pulley 181 is mounted. The motor 178 also includes a second shaft end 182 which is coupled to an electric brake 183 by means of a coupling 184.

The frame 175 also includes a pair of lower guide sleeve 185 and a pair of upper guide sleeves 186 through which a pair of support shafts 187 pass for vertical sliding movement. A connecting bar 188 extends between the support rods 187 and is secured thereto in an adjustable manner above the guide sleeves 185. The connector bar 188 includes an extension 190 which carries a pair of cam followers 191, 192. Referring now to FIG. 3, it will be seen that a cam assembly, generally identified by the numeral 193, extends about the lower portion of the machine 30 and is carried by the base 31 in any suitable manner. Referring once again to FIG. 8, it will be seen that the cam assembly 193 includes an upper cam 194 engageable with the cam follower 191 and a lower cam 195 engageable with the cam 192. The cams 194 and 195, in cooperation with the cam followers 191 and 192 vertically position the connector bar 188 and the support rods 187. The upper ends of the support rods 187 are connected together by a connector bar 196 which is generally V-shaped in outline, as is shown in FIG. 7. The connector bar 196 is connected to the support rods 187 by means of nuts 197.

Referring once again to FIG. 8, it will be seen that the connector bar 196 carries a bearing assembly, generally identified by the numeral 198 which, in turn, supports for rotation a vertically elongated spindle 200. The spindle 200 carries the body support 113 in a manner to be described hereinafter.

The frame 175 also includes a sleeve portion 201 which is generally aligned with the pulley 181. The sleeve portion 201 has mounted therein an upper bearing assembly 202 and a lower bearing assembly 203 which supports for rotation a drive sleeve 204. The drive sleeve 204 is axially fixed and carries a driven pulley 205 which is aligned with the pulley 181. A drive belt 206 connects the pulley 205 to the pulley 181 for rotation thereby.

The drive sleeve 204 is hollow and is internally splined or internally keyed to have interlocking driving engagement with a lower portion 207 of the spindle 205 which passes therethrough. The connection between the spindle lower portion 207 and the drive sleeve 204 is such that the spindle 200 is driven by the drive sleeve 204 while being relatively movable axially relative thereto.

It is to be noted that the platen 115 is carried by the upper end of the spindle 200 and is fixed relative thereto. With reference to FIG. 17, when the can body C is moved into telescoped relation with respect to the lower end of the tool pack 43, the platen 115 is spaced above the lower shoulder on the mold housing halves 54,55. Then, when the mold segments 105 move downwardly to clamp the flange F against the platen 115, it is also necessary that the platen 115 be movable downwardly slightly so that it, in turn, is clamped against the mold housing halves 54,55. It is, therefore, necessary that the spindle 200 have limited axial downward movement relative to the connector 196.

Referring once again to FIG. 8, it will be seen that the connector 196 has a lower cup shaped member 208. This lower cup shaped member 208 has reacting thereagainst a lower end of a compression spring 210. The upper end of the spring 210 reacts against the bearing assembly 198 and holds the same into tight engagement with a cover plate 211 carried by the connector 196. However, when downward movement of the platen 115 is effected by the downward movement of the mold segments 105, the spindle 200 is free to move downwardly a slight amount with the bearing assembly 198 moving downwardly therewith against the compression of the spring 210. As soon as the downward force on the platen 115 is released, the spring 210 will move the bearing assembly 198 back upwardly and the plate 115 will be positioned so as to clear the mold housing halves 54,55 as they open.

The platen 115 is provided with a chuck 212 which is receivable within a can body and which is sufficiently interlockable therewith both to maintain the can body on the platen 115, but also to permit the rotation of the can body by rotating the platen 115. The can body is rotated so that it may be properly oriented with respect to the mold segments 105. The can body will normally be lithographed in advance. It is, therefore, necessary to angularly or circumferentially position the can body with respect to the mold segments 105.

In accordance with the broad concepts of this invention, each can body will have suitable markings thereon which may be readily detected by a photoelectric type detector which is carried by the upper part of the frame 175 and which is generally identified by the numeral 213. With the body support 113 in the lower portion shown in FIG. 8, the platen 115 is rotated and when the predetermined marking on the can body is detected by the photoelectric detector 213, the motor 178 is automatically de-energized and the brake 183 energized. Through a proper setting of the controls, the can body can be made to stop at a predetermined oriented position with respect to the mold segments 105. Inasmuch as the control mechanism is not a part of this invention, no further description will be given here as to the exact workings thereof.

CHUCK CONSTRUCTIONS

Referring now to FIGS. 9 and 10, it will be seen that the upper end of the spindle 200 terminates in a sleeve 215 which is internally threaded. It is also to be noted that the platen 115 is provided with a stud 216 which is threaded into the sleeve 215 so as to removably secure the platen 115 to the spindle 200.

The chuck 212 includes a combined guide and hold down plate 217 which overlies the platen 115 and which is removably secured thereto by means of suitable fasteners 218. A spring plate 220 underlies the plate 217 as clamped between the plate 217 and the platen 115. The spring plate 220 is generally annular in plan and has disposed about the periphery thereof a plurality of individual spring fingers 221. This is clearly shown in FIG. 10. The spring plate 220 is accurately positioned by means of an upstanding boss 222 on the platen 115 which fits within a central opening 223 in the spring plate 220.

With particular reference to FIG. 11, it will be seen that each spring finger is connected to the spring plate 220 by a radius 224 and normally slopes upwardly and radially outwardly. Each spring finger 221 terminates in a radially inwardly directed free end 225 which is connected to the remainder of the spring finger by a radius 226.

At this time it is also pointed out that the plate 217 is provided with an undercut 227 to provide clearance for the spring fingers 221 when they spring inwardly. When the body support 113 moves upwardly with respect to a vertically fixed can body C, alignment of the can body C with the chuck 212 is assured by the lower flange F engaging the plate 217, if there is any misalignment, and being automatically centered. As the plate 217 is telescoped relative to the can body, the flange F will engage the spring fingers 221 and will flex the same inwardly as is shown in dotted lines in FIG. 11. The spring fingers 221, however, due to their inherent resiliency, engage the interior of the can body with sufficient pressure so as to grip the can body and thus retain the same on the body support 113 even though the same may be rotating. It will be noted that telescoping engagement of the can body with respect to the chuck is restricted by engagement of the flange F with the platen 115.

A particular advantage of the multiple finger chuck construction is the gripping thereof. Further, the spring fingers do not have a tendency to break, and even if several spring fingers should break, the chuck would still effectively function.

Reference is now made to FIG. 12 wherein there is illustrated a modified form of chuck construction generally identified by the numeral 228. The chuck 228 is carried by a platen 115 which may be identical to that shown in FIG. 9. The chuck 228 includes a coil spring 230 which has a major portion thereof seated within a recess 231 formed in a plate 232 which replaces the plate 217. The individual convolutions of the spring 230 are disposed substantially vertical whereby when a can body C is telescoped over the spring 230, the convolutions are flattened radially inwardly as opposed to twisting and thereby apply an outwardly directed radial force on the interior of the can body very similar to that applied by the fingers 221.

In FIG. 13 there is illustrated still another chuck construction which is identified generally by the reference numeral 233. The chuck 233 is carried by the platen 115 and includes a resilient ring 234 which is seated within a recess 235 in a plate 236 which replaces the plate 217. It is to be noted that the resilient ring 234 is generally rectangular or square in cross section, but is provided with circumferential grooves 237 in the face thereof. The ring 234 has a nominal external diameter greater than the internal diameter of the can body C. However, as the flange F of the can body moves towards telescoping relationship with respect to the ring 234, the radius of the flange F serves as a cam to force the material of the ring 234 radially inwardly. Since the faces of the ring 234 are circumferentially grooved, it will be seen that there is automatically provided space for the extrusion of the material of the ring 234 so that the can body C may telescope thereover. After the can body is telescoped over the ring 234, the elasticity of the ring 234 results in a sufficient radial force being applied against the can body C to retain the same in place on the platen 115.

TRANSFER ASSEMBLY

Figure 2:
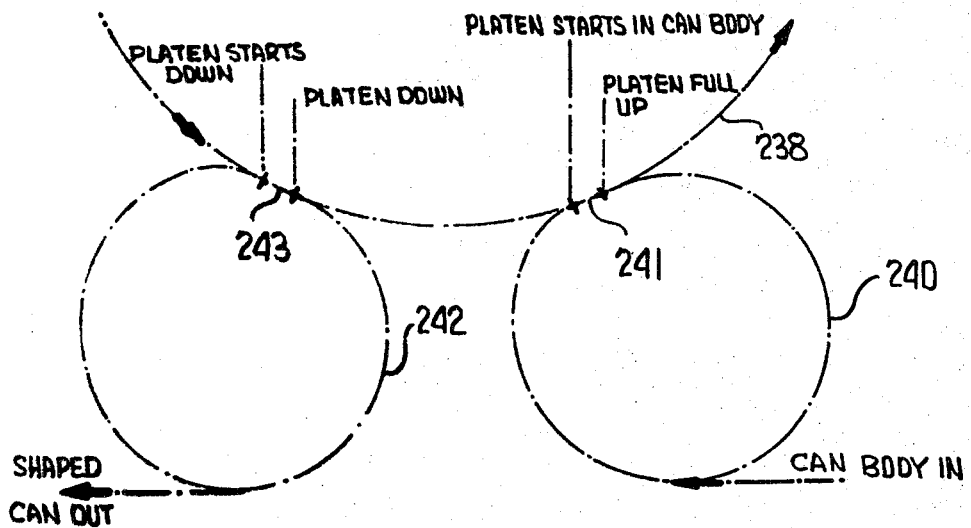
FIG. 2 is a schematic showing generally the transfer relationship and can body support vertical positions.

Referring now to FIGS. 1 and 2, it will be seen that the platens 115 move about a circular path and this path is identified in FIG. 2 by the numeral 238. A normal infeed turret would move a can body in a circular path which would be coextensive with the path 238 at a single point. The same is true of the path of movement of a can body by an outfeed turret. As a result, it is necessary that indexing occurs at the time of transfer. However, in accordance with this invention, indexing is eliminated and the platens 115 constantly move along the path 238 during the transfer of can bodies to and from the platens. This is accomplished by providing an infeed transfer device having a can body path of movement which is modified from a true circle. This path of movement of the infeed transfer device is identified by the numeral 240 and while a major portion thereof may be circular, the can body path of movement 240 is modified as at 241 so as to be circular, but along the path of movement 238 so that the two paths of movement are coextensive for a relatively long period of time, which period of time is sufficient for the transfer of a can body to the platen 115.

In a like manner, in accordance with this invention, there is provided an outfeed transfer device having a path of movement 242 which is primarily circular, but has a portion thereof deviating from a true circle with a part of that deviated portion as at 243 being circular, but coextensive with the path of movement 238. Thus, when shaped can bodies are to be transferred from the platens 115, the path of movement of the platens 115 will be coextensive with the path of movement of pockets of the outfeed transfer device sufficiently long for the transfer to be effected.

Figure 4:
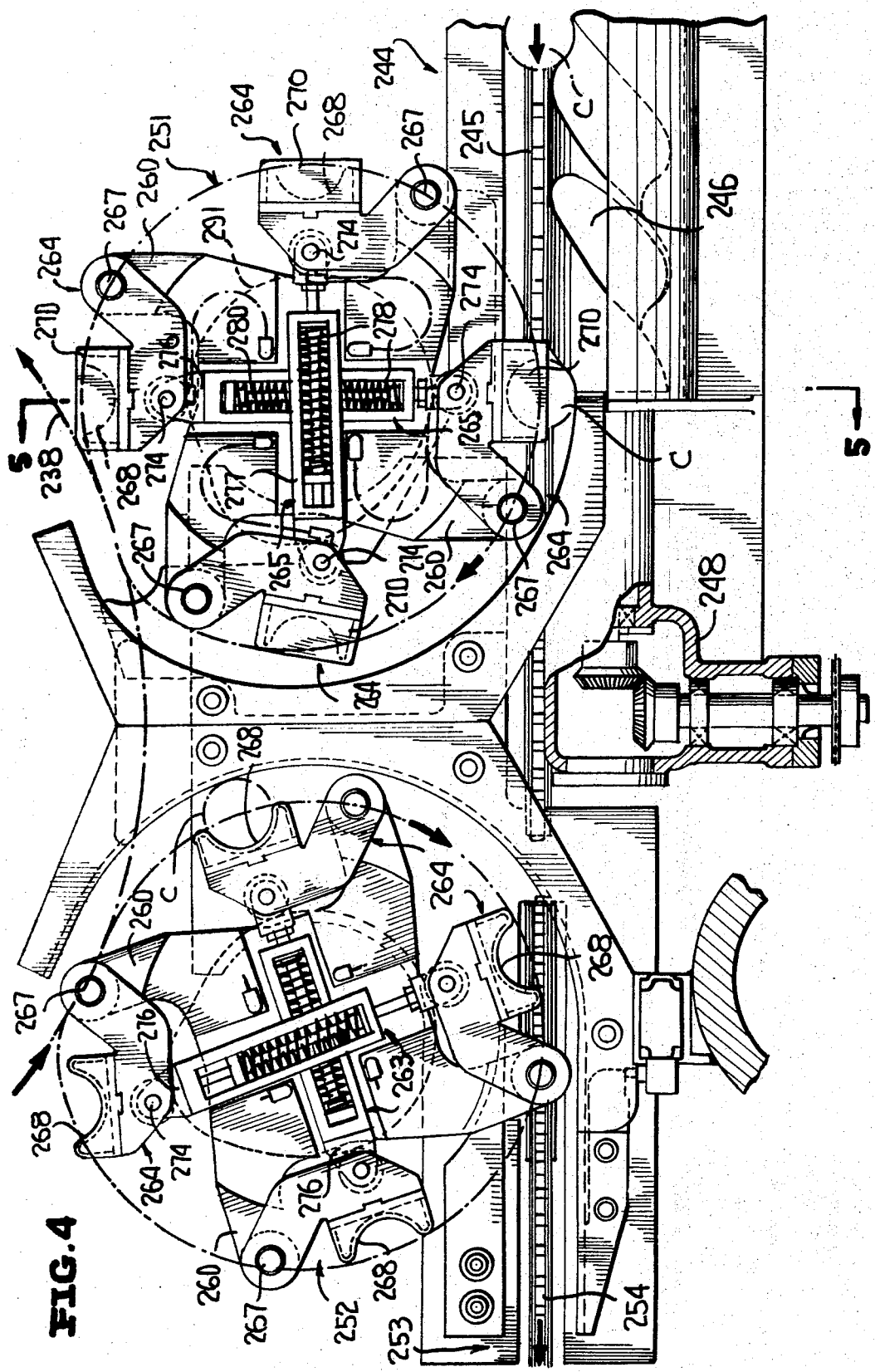
FIG. 4 is an enlarged plan view of the transfer units of the machine and shows specifically the details thereof.

Referring now to FIGS. 1 and 4, it will be seen that at the front of the machine 30 there is a combined guide and infeed assembly which is identified by the numeral 244. The assembly 244 includes a constantly moving conveyor chain 245 on which can bodies C seat and which moves the can bodies C towards the machine 30 along a straight line, but at no predetermined spacing. Along that portion of the endless conveyor 245 which is generally in front of the machine 30, a feed screw 246 is provided. In advance of the feed screw is an escapement mechanism 247 which allowed one can body C to be delivered to the feed screw 246 at a time, generally in accordance with the demands of the machine 30. The feed screw 246 automatically assures the spacing of the can bodies C in accordance with the requirements of the machine 30. The feed screw 246 is driven by means of a right angle drive mechanism 248 in a manner to be described hereinafter.

Can bodies C moving at a predetermined rate and at a predetermined spacing are received by an infeed transfer device generally identified by the numeral 251, and are delivered to the platens 115.

After the desired shaping of the can bodies has been effected, the shaped can bodies are removed from the platens 115 by an outfeed transfer device, generally referred to by the numeral 252. The transfer device 252 delivers the shaped can bodies to a second combined guide and feed assembly, generally identified by the numeral 253 which also moves the can bodies in a straight line. This assembly includes an endless conveyor 254 on which the can bodies are seated and which move the can bodies to the left as viewed in FIGS. 1 and 4.

It is to be understood that the transfer devices 251 and 252 are of a substantially identical construction, and therefore, only a transfer device 251 will be described in detail here.

Reference is first made to FIG. 6 wherein there is illustrated the essential components of the transfer device 251. One of these components is a turret member, generally identified by the numeral 255. The turret member 255 is in the form of a plate 256 having a hollow boss 257 secured to the underside thereof and with a bore 258 extending therethrough. The plate 256 is provided with a plurality of bifurcated arms 260. In addition, the plate 256 is provided with crossing grooves 261 and 262 with the groove 261 being deeper than the groove 262.

The transfer device 251 also includes pairs of pocket assemblies with a typical pocket assembly being illustrated in FIG. 6 and being identified by the numeral 263. Each pocket assembly 263 includes a pair of remote pocket members 264 connected together by a spring loaded connector, generally identified by the numeral 265.

Each pocket member 264 is identical and has a pair of mounting arms 266 extending from one side thereof for engagement over an associated bifurcated arm 260 and for pivotal connection thereto by means of a pivot pin 267, as shown in FIG. 5. The pocket member is provided with a pair of can body socket defining plates 268 and a can body hold down plate 270 which are disposed remote from the spring connector 265. The inner part of each pocket member is configurated to define a lower socket 271 in which a cam follower 272 is seated. Above the lower socket 271 is an upper socket 273 in which an end of the associated spring connector 265 is positioned and which end is connected to the pocket member by means of a pin 274. It is to be understood that the upper sockets 273 are of sufficient height whereby spring connectors 265 may be arranged in crossing relation. The lowermost spring connector 265 will be seated in the deep groove 261 and the uppermost spring connector 265 will be seated in the shallow groove 262, as is clearly shown in FIG. 5.

Each spring connector 265 includes an elongated connector member 275 having an end portion 276 in the form of an eye receiving one of the pins 274. The connetor member 275 has an elongated opening 277 therethrough in which there is positioned a compression spring 278. A rod 280 extends into the end of the connector member 275 remote from the portion 276 with the rod being guided by a bushing 281 seated in the adjacent end of the connector member 275. The opposite end of the rod 280 extends into the end portion 276 of the connector member 275 and is provided with a collar 282. The spring 278 is compressed between the bushing 281 and the collar 282 with the spring 278 resisitng the separation of the pocket members 264 of the respective pair.

Referring now to FIG. 3, it will be seen that the transfer device 251 includes a housing 282 which is suitably mounted on the base 31. The housing 282 has rotatably journalled therein a shaft 283 with the lower end of the shaft 283 carrying a pinion gear 284 which is meshed with a ring gear 285 secured to the central frame 40 for rotating the same in a manner to be described hereinafter.

Referring once again to FIG. 5, it will be seen that the housing 282 has secured to the upper end thereof an extension 286. The extension 286 is disposed about the boss or hub 257 of the turret member 255 and will be provided with suitable fittings for supplying lubricant to the interior thereof. Lubricant flows through passages in the housing extension 286 and then through lubricant lines to lubricate the pivot pins 267.

It is to be noted that the hub 255 is secured to the upper end of the shaft 283 by a suitable fastener 288 and a key 290 for rotation with the shaft 283.

It will also be seen that the housing extension 286 has mounted on the upper end portion thereof a cam 291 for engagement by the cam followers 272. As is clearly shown in FIG. 4, the cam 291 is of a configuration wherein while for the most part of their travel the pocket members 264 move in a circular path, this path is modified as the pocket members 264 approach the path 238 of travel of the body supports 113 and the path of travel of the pocket members 264 as that illustrated in FIG. 2 and identified by the numeral 240.

Returning once again to FIG. 3, it will be seen that there is illustrated the drive for the endless conveyor 245 and the feed screw 246. The shaft 283 has a double gear 292 mounted thereon and the same drives a gear 293 of a take off shaft 294. Through a sprocket and chain connection 295, the take off shaft 294 drives a shaft 296 which carries a sprocket 297 of the conveyor 245. The shaft 296 also drives the right angle drive unit 248 to drive the feed screw 246.

It is to be noted that the transfer device 252 is of a similar construction to the transfer device 251, but the auxiliary drive just described is not necessary. Further, it is to be noted that the transfer device 252 has a shaft 298 which corresponds to the shaft 283, but which extends down further into the base 31 and which is connected by a coupling 300 to a drive unit 301 which, in turn, is driven by a motor 302. Further, it is to be noted that the shaft 298 carries a pinion gear 303, which corresponds to the pinion gear 284, but which is the drive gear for the ring gear 285. Thus, the shaft 298 is directly driven from the power unit 301 and the pinion gear 303 drives the ring gear 285 which, in turn, drives the pinon gear 284.

An important feature of the machine is also illustrated in FIG. 3. It is to be noted that the ring gear 285 is carried by a ring member 304 and this ring member has associated therewith a brake caliper 305. There will be a plurality of such brake calipers 305 disposed circumferentially about the ring 304 and the ring 304 and the calipers 305 form what is commonly referred to as a disc brake.

In the past large machines have been driven in the customary manner illustrated herein. That is, the rotating component is provided with a ring gear, and the ring gear is driven through a pinion. Such a drive has been effective. However, in the past when the machines are equipped with a brake, the brake is normally incorporated with the motor or the drive unit with the result that when it is desired to stop the machine quickly in an emergency, there is an immediate lock up of the drive mechanism placing a great strain on the gears and shafts involved. In accordance with this invention, by utilizing a disc brake arrangement, these stresses have been eliminated. While the specific details thereof have not been illustrated herein and will not be described in further detail hereinafter, it is to be understood that in the conventional operation of the machine 30, when it is necessary to stop the operation of the machine, the motor 302 will be de-energized simultaneously with the energization of the calipers 305. Thus, there is never any undesirable opposed reaction between the brake system and the drive system.

HYDRAULIC SYSTEM

Figure 21:
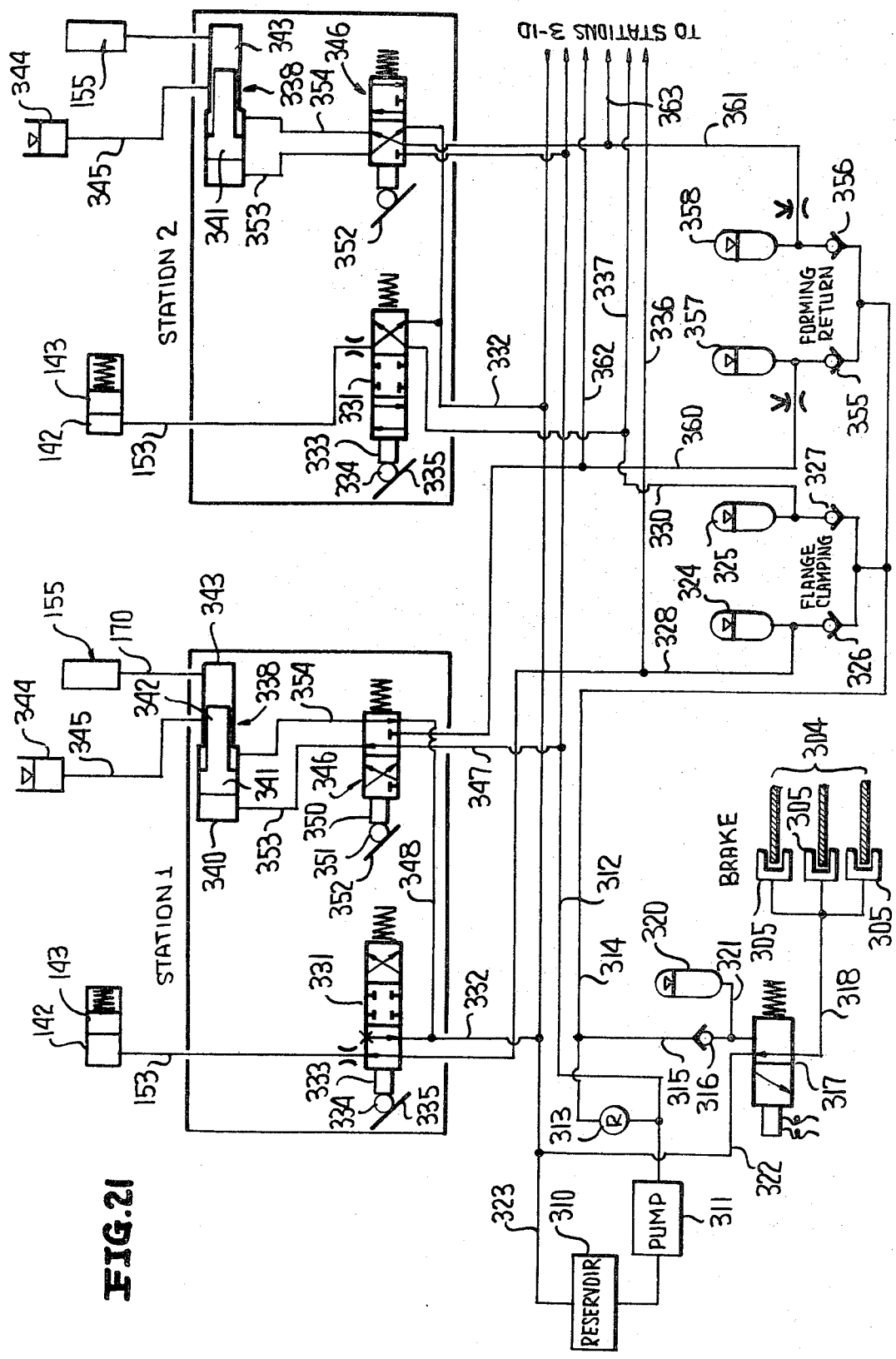
FIG. 21 is a hydraulic schematic of the machine.

Reference is now made to FIG. 21 wherein the hydraulic system of the machine 30 is schematically illustrated. Basically, the system includes a reservoir 310 for hydraulic fluid and the reservoir 310 supplies a pump 311. The pump 311 delivers hydraulic fluid under high pressure to a high pressure line 312. The pump also directs fluid through a pressure reducer 313 to a low pressure line 314.

Inasmuch as the disc brake system has been previously described, the hydraulic system thereof will be first described. A branch line 315 extends from the low pressure hydraulic line 314 through a check valve 316 into a solenoid controlled valve 317 which controls the supplying of hydraulic fluid under pressure to the calipers 305. A line 318 extends from the valve 317 to the calipers 305. The hydraulic system for the brake also includes an accumulator 320 which is connected to the line 315 between the check valve 316 and the valve 317 by a line 321. Also, the brake system includes a return line 322 which is connected to a main return line 323 to the reservoir 310.

The normal position of the valve 317 is one wherein the calipers 305 are connected directly to the reservoir 310. When it is desired to stop the machine 30, a suitable control mechanism will be energized, simultaneously de-energizing the motor 302 and shifting the valve 317 to the right coupling the low pressure hydraulic supply to the calipers 305 and energizing the claipers 305 so as to grip the ring 304 and effectively stop the rotation of the central frame 40 and the components carried thereby.

Before describing the hydraulic system with respect to the individual body shapers, it is to be understood that for certain purposes, the body shapers will be coupled in two sets, the body shapers at stations 1, 3, 5, 7 and 9 forming one set and the body shapers at stations 2, 4, 6, 8 and 10 forming a second set.

FLANGE CLAMPING

The low pressure hydraulic line 314 is connected to a pair of accumulators 324, 325 through check valves 326 and 327, respectively. A low pressure line 328 is coupled between the check valve 326 and the accumulator 324 and is directed to a first set of body shapers.

In a like manner, a low pressure line 330 is connected between the check valve 327 and the accumulator 325 and leads to a second set of the body shapers.

The line 328 is connected to a control valve 331 of each body shaper of the first set of body shapers. A return line 332 also leads between the valve 331 and the return line 323. The valve 331 controls flow of low pressure hydraulic fluid through the hydraulic line 153 (FIGS. 3 and 21) and leads into the cylinder 142 for reaction against the piston portion 143 in opposition to the reactions of the spring loaded pins 131 and 146, as is clearly shown in FIG. 17 and previously described.

The valve 331 is a cam actuated valve and includes a control plunger 333 having a cam follower 334 which is engageable with a fixed cam 335. It is to be understood that the valve 331 will rotate with the central frame 40 and the cam 335 will be suitably fixedly mounted on the head structure 33 of the machine whereby the valve 331 is shifted during the normal rotation of the central frame 40 so as to clamp together the components of the body shaper in the previously described manner in proper timed relation.

It will be noted that each of the stations of the machine 30 is provided with a valve 331 and the same is actuated by the cam 335 in the proper timed relationship. The only difference between the flange clamping operation at station 2 from the aforedescribed flange clamping operation at station 1 is that the hydraulic fluid necessary for this clamping operation is assured by the accumulator 325 instead of the accumulator 324 which assures the flange clamping operation at station 1.

It is also pointed out at this time that a line 336 extends from the low pressure fluid line 328 to stations 3, 5, 7 and 9. A similar line 337 extends from the low pressure line 330 to stations 4, 6, 8 and 10.

FORMING OPERATION

The forming operation within each mold unit is accomplished by directing water under high pressure into the membrane 155. This is accomplished at each station by a double cylinder, double piston pump assembly generally identified by the numeral 338. The pump assembly includes a first and larger cylinder 340 having a piston 341 therein. The piston 341 is positively connected to a smaller piston 342 in a smaller cylinder 343.

The fluid line 170 of FIG. 3 connects the respective cylinder 343 to the respective membrane 155. Thus, when the piston 342 is moved to the right, water will be pumped at a high pressure into the membrane 155. Each station is provided with its own individual water supply reservoir 344 which is of a limited capacity and which will be described hereinafter. Each reservoir 344 is connected to its respective cylinder 343 by means of a line 345.

Pressurization of the membrane 155 for the body shaper at station 1 is controlled by a valve 346. The valve 346 has connected thereto a high pressure fluid line 347 which is coupled to the high pressure line 312. It also has connected thereto a return line 348 which is coupled to the return line 332. The valve 346 is a cam actuated valve and includes a plunger 350 carrying a cam follower 351 which engages a fixed cam 352. The valve 346 will be carried by the central frame 40 and rotates therewith, and the fixed cam 352 is carried by the head structure 33. During the forming operation of station 1, hydraulic fluid under high pressure is delivered into the cylinder 340 through a line 353 to the left of the piston 341 while the cylinder to the right of the piston 341 is vented through line 354. The pistons 341 and 342 move to the right compressing the water within the cylinder 343 and internally pressurizing the membrane 155 to shape a can body telescoped thereover.

Each of the other stations of the machine 30 is also provided with a valve 346 which is actuated by the cam 352 and which controls the flow into and out of a pump assembly 338. Accordingly, no further description is required with respect station 2 and the other stations.

FORMING RETURN

Although high pressure is utilized to advance the pistons 341 during a forming operation, it is desired that the pressure utilized to return the pistons 341 be low pressure. Accordingly, a separate system is provided for removing the pressure from the membranes 155. Further, this separate system is split into first and second series as described above with respect to the flange clamping system.

The low pressure line 314 leads through check valves 355,356 into accumulators 357,358. A line 360 is coupled in the system between the check valve 355 and the accumulator 357 and leads to the valve 346 at the first station. In a like manner, a line 361 is coupled in the system between the check valve 356 and the accumulator 358 and leads to the valve 346 at station 2. A line 362 leads from line 360 to stations 3, 5, 7 and 9 and a like line 363 leads from line 361 to stations 4, 6, 8 and 10. As is clearly shown with respect to the valve 346 at station 2, in the forming return position of the valve 346, low pressure fluid is delivered through the line 354 to the right of the piston 341 and moves the same to the left with fluid to the right of the piston 341 returning through line 353 to the reservoir 310.

Referring now to FIG. 3, it will be seen that the central frame 40 has a manifold system which includes a central manifold member 365 running up the center thereof for rotation therewith. The manifold 365 is connected at its lower end to a rotary union 366 which is fixedly mounted by means of a support 367 on the base 31 of the machine. The necessary fluid lines will be coupled to the rotary union to permit fluid flow through the manifold 365 as required during the operation of the machine.

It is also pointed out here that the machine 30 includes a rotary head, generally identified by the numeral 368. The rotary head 368 is disposed above the head structure and serves as a support for the accumulators and valves and much of the piping or fluid lines shown in FIG. 21. At the same time, the necessary cams 335 and 352 are carried by the head structure 33 to automatically control the positions of the valves 331 and 346. The particular placement of these hydraulic components is not a part of this invention, and therefore, no attempt is being made hereto specifically describe the same. However, inasmuch as the individual reservoirs 344 for the various stations is believed to be novel, this will be described with reference to FIG. 3.

It is to be noted that the rotary head structure 368 includes a generally channel shaped member 370 which is annular in extent. The individual reservoirs 344 are defined by a series of baffles 371 disposed within the channel 370. It is further to be noted that these baffles 371 each has an upper edge wherein the innermost portion is relatively low and horizontal and thereafter, the upper edge slopes outwardly and upwardly to the top edge of the channel. This particular baffle configuration is provided in that as the central frame 40 and the rotating head structures 368 rotate, the water within the reservoirs 344 is thrown to the outside and has a greater height. By providing this particular baffle configuration, the individual reservoirs 344 can be maintained while at the same time water may be added to all of the reservoirs 344 from a single inlet device 372 with the water being supplied periodically when it is required.

It will be readily apparent that inasmuch as there is only a limited supply of water for each of the stations, in the event of the rupture of one of the high pressure lines 170 or the membrane 155 only that water within the individual reservoir 344 will be lost, thereby making the cleanup job a minimum one.

Although only a preferred embodiment of the invention has been specifically illustrated and described herein, minor variations may be made in the machine and the numerous components thereof without departing from the spirit of the invention, as defined by the appended claims.

What is claimed as new:

1. In a shaper for tubular bodies, a shaping membrane assembly comprising a support having radiating fluid passages opening therefrom, a perforated sleeve surrounding said support for radially outwardly distributing fluid flowing from said passages, a replaceable membrane surrounding said sleeve, said membrane being tubular and having a closed axially displaceable bottom wall, means for sealing said membrane to said support at only the end thereof remote from said bottom wall, and an axial port in said support directed toward said bottom wall.

2. The membrane assembly of claim 1 wherein said membrane is initially of a size of stretchedly engage over said sleeve.

3. The membrane assembly of claim 1 wherein said membrane is initially of a size to stretchedly engage over said sleeve and to be freely received in a tubular body to be shaped whereby said membrane may be repeatedly expanded an unexpected number of times in the shaping of tubular bodies prior to the permanent deformation thereof to the extent that it offers resistance to the telescoping of tubular bodies thereover.

* * * * *